United States Patent [19]

Dorn et al.

[11] Patent Number: 5,221,527
[45] Date of Patent: Jun. 22, 1993

[54] PROCESS FOR PRODUCING ALUMINUM NITRIDE

[75] Inventors: Friedrich-Wilhelm Dorn, Hürth; Heinz Zschach, Cologne, both of Fed. Rep. of Germany

[73] Assignee: Hoechst Aktiengesellschaft, Frankfurt Am Main, Fed. Rep. of Germany

[21] Appl. No.: 715,489

[22] Filed: Jun. 14, 1991

[30] Foreign Application Priority Data

Jun. 30, 1990 [DE] Fed. Rep. of Germany ....... 4020905

[51] Int. Cl.⁵ .......................................... C01B 21/072
[52] U.S. Cl. .................................................. 423/412
[58] Field of Search ................... 423/412, 409, 406; 501/96, 98; 51/307

[56] References Cited

U.S. PATENT DOCUMENTS

| | | | |
|---|---|---|---|
| 4,618,592 | 10/1981 | Kuramoto et al. | 423/412 |
| 4,680,278 | 7/1987 | Inoue et al. | 423/412 |
| 4,975,260 | 12/1990 | Imai et al. | 423/412 |

FOREIGN PATENT DOCUMENTS

| | | | |
|---|---|---|---|
| 186144 | 7/1986 | European Pat. Off. | 423/412 |
| 60-60910 | 4/1985 | Japan . | |
| 61-151006 | 7/1986 | Japan . | |
| 61-155210 | 7/1986 | Japan . | |
| 3030307 | 2/1988 | Japan | 423/412 |
| 63-30307 | 9/1988 | Japan . | |
| 63-297207 | 12/1988 | Japan .. | |
| 2233969 | 1/1991 | United Kingdom . | |

OTHER PUBLICATIONS

Abstract and Translation of JP 63-297207, Dec. 5, 1988.

*Primary Examiner*—Michael Lewis
*Assistant Examiner*—Stephen G. Kalinchak
*Attorney, Agent, or Firm*—Connolly & Hutz

[57] ABSTRACT

For producing finely disperse aluminum nitride by reacting hydroxides of aluminum with carbon in a molar ratio of (1:1.5) to (1:2.5), the hydroxides of aluminum are intensively ground together with carbon, in particular carbon black, using a non-aqueous grinding fluid. After the non-aqueous grinding fluid has been separated off from the suspension, the ground material obtained is calcined at 400° to 1000° C., while passing nitrogen through. The material obtained is then treated under intensive contact with nitrogen for 1 to 100 hours at 1400° to 1700° C., before the excess carbon contained in the reaction product is removed by heating to 500° to 900° C. in contact with oxygen-containing gases.

The hydroxides of aluminum and the carbon can also be intensively ground separately from one another, using a non-aqueous grinding fluid, and the suspensions obtained can be mixed.

12 Claims, No Drawings

PROCESS FOR PRODUCING ALUMINUM NITRIDE

The present invention relates to a process for producing finely disperse aluminum nitride by reacting hydroxides of aluminum with carbon in a molar ratio of (1:1.5) to (1:2.5).

Aluminum nitride powder is used for producing sintered aluminum nitride bodies which are used as substrates for electronic circuits and as housing for integrated circuit boards. Such ceramic sintered bodies have to meet stringent demands with respect to thermal conductivity, strength and further mechanical and technical properties. These demands can be met only if the aluminum nitride powder used has certain preset properties with respect to purity, grain size, grain size distribution, sinterability and processability.

Several reaction routes are known for producing aluminum nitride; for example, the reaction of aluminum metal with nitrogen, the reaction of aluminum halides with ammonia and the reduction of alumina with carbon in the presence of nitrogen.

U.S. Pat. No. 4,618,592 describes the production of finely disperse aluminum nitride by the last mentioned reaction route. According to this, a pure, finely disperse and readily sinterable aluminum nitride is obtained by reacting highly pure alumina (99.99% of $Al_2O_3$, average particle diameter 0.52 $\mu$m, impurities of Mg, Cr, Si, Zn, Fe, Cu, Ca, Ni, and Ti each at most 30 mg/kg) with carbon black (ash content: 0.08%) and nitrogen at 1550° to 1650° C. and subsequently burning the excess carbon black off with oxygen-containing gases at 750° to 800° C.

A disadvantage of the process, described in U.S. Pat. No. 4,618,592, for producing aluminum nitride is that the raw material used must be highly pure and very fine-grained $Al_2O_3$ powder which is very expensive, because such $Al_2O_3$ grains can not be produced by the large-scale industrial Bayer process.

It is therefore the object of the present invention to provide a process for producing finely disperse aluminum nitride, in which aluminum compounds are used which are industrially available in a suitable purity and at an advantageous price. According to the invention, this is achieved by a) intensively grinding the hydroxides of aluminum together with carbon, in particular carbon black, using a non-aqueous grinding fluid,
b) separating the non-aqueous grinding fluid from the suspension to obtain a ground material,
c) calcining the ground material at 400° to 1000° C. while passing nitrogen through,
d) treating the material obtained according to c) under intensive contact with nitrogen for 1 to 100 hours at 1400° to 1700° C., and
e) removing the excess carbon contained in the reaction product according to d), by heating to 500° to 900° C. in contact with oxygen-containing gases.

The process according to the invention can also be modified in such a way that the hydroxides of aluminum and the carbon are intensively ground separately from one another, using a non-aqueous grinding fluid, and the suspensions obtained are mixed.

Furthermore, the process according to the invention can, if desired, also be developed further by aa) drying the hydroxides of aluminum at temperatures up to 300° C. to remove water adhering thereto, before they are introduced into the non-aqueous grinding fluid,
bb) the hydroxides of aluminum having grain sizes of $d_{50} > 2$ $\mu$m,
cc) the carbon having grain sizes of $< 2$ $\mu$m,
dd) drying the ground material at temperatures up to 300° C. before calcining,
ee) heating the calcined material for 0.1 to 10 hours at 1100° to 1350° C. while passing nitrogen through,
ff) using hydrocarbons as the anhydrous grinding fluid,
gg) using aliphatic alcohols as the anhydrous grinding fluid,
hh) using 2-propanol,
ii) using AlOOH as the hydroxide of aluminum, and
jj) using $Al(OH)_3$ as the hydroxide of aluminum.

Using the process according to the invention, a fine-grain aluminum nitride is obtained, evidently because the enveloping of the hydroxides of aluminum with carbon prevents the grain growth which otherwise occurs.

Air, carbon dioxide, nitrogen or mixtures thereof can be used as oxygen-containing gas in the process according to the invention.

The subject of the invention is explained by the examples which follow, the BET surface area being determined by the method of Brunauer, Emmett and Teller (cf. Z. Anal. Chem. 238 (1968) pages 187 to 193), and $d_{90}$, $d_{50}$ and $d_{10}$ designating equivalent particle diameters for the values 90%, 50% and 10% of the accumulative distribution curve (by mass) which were determined by SEDIGRAPH 500 ET made by Coulter Electronics.

EXAMPLE 1 (according to the invention)

85 g of boehmite containing adhering water (AlOOH; with 37.5% of Al, 40 ppm of Na, 2 ppm of Mg, 8 ppm of Ca, 10 ppm of Si, 3 ppm of Ti, and 16 ppm of Fe; BET surface area: 160 m$^2$/g; grain size distribution: $d_{90}$ 21 $\mu$m, $d_{50}$ 5.7 $\mu$m, $d_{10}$ <0.3 $\mu$m) were dried for 5 hours at 250° C. in a drying cabinet in air, after which 73.2 g of dried boehmite were obtained. The dried boehmite was added together with 25.5 g of carbon black (volatile constituents: 0.1%; 0.4 ppm of Na, 0.3 ppm of Mg, 2.5 ppm of Ca, 6 ppm of Si, <0.5 ppm of Ti, and 16 ppm of Fe; BET surface area: 60 m$^2$/g) corresponding to an Al:C molar ratio of 1:1.8 to 1 l of 2-propanol and ground together for 4 hours in a stirred ball mill. The 2-propanol was distilled off from the resulting suspension and the ground material was dried.

The ground material from 10 batches of the type described was combined and calcined first for 1.5 hours at 450° C. and then for 2 hours at 700° C., while passing nitrogen through.

615 g of this calcined product were heated in a graphite crucible (12 cm internal diameter) for 1.5 hours at 1250° C. while passing 500 l/h of nitrogen through and then treated for 11.5 hours at 1600° C. After cooling, a weight loss of 38.8% was found. After heating the reaction product in air for one hour at 700° C., white aluminum nitride (AlN; with 1.1% of O, 0.03% of C, <20 ppm of Na, <5 ppm of Mg, <10 ppm of Ca, 20 ppm of Si, <5 ppm of Ti and 28 ppm of Fe; BET surface area: 3.6 m$^2$/g; grain size distribution: $d_{90}$ 2.45 $\mu$m, $d_{50}$ 1.28 $\mu$m, $d_{10}$ 0.86 $\mu$m; $\alpha$-$Al_2O_3$ not detectable) was obtained with a weight loss of 8.9%.

EXAMPLE 2 (according to the invention)

Example 1 was repeated with the modification that the dried boehmite and the carbon black were ground for only 1 hour in 2-propanol in the stirred ball mill. The resulting aluminum nitride contained 0.9% of O and 0.04% of C; its BET surface area was 2.5 m$^2$/g and its grain size distribution was $d_{90}$ 5.1 µm, $d_{50}$ 2.0 µm, and $d_{10}$ 0.8 µm.

EXAMPLE 3 (according to the invention)

Example 1 was repeated with the modification that the dried boehmite and the carbon black were ground for only 0.25 hours in 2-propanol in the stirred ball mill. The resulting aluminum nitride contained 0.8% of O, and 0.05% of C; its BET surface area was 1.6 m$^2$/g and its grain size distribution was $d_{90}$ 11 µm, $d_{50}$ 4.2 µm, and $d_{10}$ 1.35 µm.

EXAMPLE 4 (according to the invention)

Example 1 was repeated with the modifications that 205 g of calcined product were treated in the graphite crucible for 63 hours at 1450° C., while passing 200 l/h of nitrogen through.

The resulting aluminum nitride contained 1.3% of O, 0.03% of C and 0.3% of $\alpha$-Al$_2$O$_3$, and its grain size distribution was $d_{90}$ 1.63 µm, $d_{50}$ 0.84 µm, and $d_{10}$ 0.45 µm.

EXAMPLE 5 (according to the invention)

Example 4 was repeated with the modification that the calcined product was treated in the graphite crucible for 7 hours at 1650° C.

The resulting aluminum nitride contained 1.1% of O and 0.20% of C, $\alpha$-Al$_2$O$_3$ was not detectable, and its grain size distribution was $d_{90}$ 1.98 µm, $d_{50}$ 1.13 µm and $d_{10}$ 0.79 µm.

EXAMPLE 6 (according to the invention)

75 g of water-containing boehmite (AlOOH; with 42.2% of Al, <20 ppm of Na, <10 ppm of Ca, 40 ppm of Si, and 40 ppm of Fe; BET surface area: 140 m$^2$/g; grain size distribution: $d_{90}$ 37 µm, $d_{50}$ 7.2 µm, and $d_{10}$ 0.4 µm) were treated for 5 hours at 250° C. in air in a drying cabinet, to form 70.8 g of dried boehmite.

The dried boehmite was added together with 25.5 g of the carbon black used in Example 1, corresponding to an Al:C molar ratio of 1:1.8, into 1 l of 2-propanol and ground together for 4 hours in a stirred ball mill. The 2-propanol was distilled off from the resulting suspension and the ground material was dried.

10 ground batches of the type described were combined and calcined first for 1.5 hours at 450° C. and then for 2 hours at 700° C., while passing nitrogen through. 655 g of this calcined product were treated in a graphite crucible (12 cm internal diameter) for 1.5 hours at 1250° C. and then for 20 hours at 1550° C., while passing 200 l/h of nitrogen through. After cooling, a weight loss of 38.7% by weight was found.

After heating of the reaction product for one hour at 700° C. in air, white to light gray aluminum nitride (AlN; with 1.3% of O, 0.04% of C, <20 ppm of Na, 30 ppm of Ca, 80 ppm of Si, and 20 ppm of Fe; BET surface area: 3.5 m$^2$/g; grain size distribution: $d_{90}$ 2.18 µm, $d_{50}$ 1.11 µm and $d_{10}$ 0.68 µm; $\alpha$-Al$_2$O$_3$ not detectable) was obtained with a weight loss of 8.8%.

EXAMPLE 7 (according to the invention)

25.5 g of the carbon black used in Example 1 were added to 0.5 l of 2-propanol and ground for 4 hours in a stirred ball mill.

At the same time, 73 g of the boehmite used in Example 1 were added to 0.5 l of 2-propanol and ground for 4 hours in a stirred ball mill.

The carbon black suspension was stirred in the course of 5 minutes into the AlOOH suspension. The 2-propanol was distilled off from the resulting total suspension and the ground material was dried.

250 g of ground material (from 4 batches of the type described) were calcined for 2 hours at 430° C. and then for 1.5 hours at 800° C. in a stream of nitrogen and then treated for 20 hours at 1550° C. After heating of the reaction product for one hour in air at 700° C., 115 g of white to light gray aluminum nitride (AlN; with 1.1% of O, 0.07% of C, 0.93% of $\alpha$-Al$_2$O$_3$; grain size distribution: $d_{90}$ 2.5 µm, $d_{50}$ 1.5 µm, and $d_{10}$ 0.90 µm) were obtained.

EXAMPLE 8 (comparison example)

200 g of the aluminum hydroxide used in Example 1 were added to 1 l of 2-propanol and ground for 4 hours in a stirred ball mill.

The 2-propanol was distilled off from the resulting suspension and the ground material was dried and ignited for 2 hours in air at 950° C. The alumina thus formed (with 50 ppm of Na, 50 ppm of Si, 35 ppm of Fe; BET surface area: 91 m$^2$/g; grain size distribution: $d_{90}$ 3.5 µm, $d_{50}$ 1.43 µm and $d_{10}$ 0.44 µm) was mixed in three batches with the carbon black used in Example 1 in an Al:C molar ratio of 1:1.65 and ground for 4 hours in a ball mill (capacity:2 l; inner wall: polyethylene; 15 mm diameter grinding balls of Al$_2$O$_3$) using 2-propanol as the grinding fluid. After distilling off the 2-propanol, the mixture was dried.

195 g of the dried mixture were treated for 14 hours at 1550° C., while passing nitrogen through.

After heating the reaction product for one hour in air at 700° C., aluminum nitride (AlN; with 1.3% of O, 0.05% of C, 1.72% of $\alpha$-Al$_2$O$_3$; BET surface area: 2 m$^2$/g; grain size distribution: $d_{90}$ 5.8 µm, $d_{50}$ 3.0 µm, and $d_{10}$ 1.45 µm) was obtained.

We claim:

1. A process for producing aluminum nitride by reacting hydroxides of aluminum with carbon in a molar ratio of 1:1.5 to 1:2.5, which comprises drying hydroxides of aluminum selected from the group consisting of AlOOH and Al(OH)$_3$ at temperatures of up to 300° C. to remove water adhering thereto; grinding said hydroxides of aluminum together with carbon having wherein said carbon has a grain size of <2 µm with the aid of a non-aqueous grinding fluid to form a suspension; separating the non-aqueous grinding fluid from the suspension to obtain a ground material; drying said ground material at temperatures of up to 300° C.; calcining said ground material at 400° to 1000° C. while passing nitrogen through, treating the calcined ground material under contact with nitrogen in a first step for 0.1 to 10 hours at 1100° to 1350° C. and in a second step for 1 to 100 hours at 1400° to 1700° C.; and removing the excess carbon contained in the reaction product by heating it to 500° to 900° C. in contact with oxygen-containing gases.

2. The process as claimed in claim 1, wherein the hydroxides of the aluminum have grain sizes of $d_{50} > 2$ $\mu m$.

3. The process as claimed in claim 1, wherein carbon black is used as the carbon.

4. The process as claimed in claim 1, wherein hydrocarbons are used as the anhydrous grinding fluid.

5. The process as claimed in claim 1, wherein aliphatic alcohols are used as the anhydrous grinding fluid.

6. The process as claimed in claim 5, wherein 2-propanol is used as said grinding fluid.

7. A process for producing aluminum nitride by reacting hydroxides of aluminum with carbon in a molar ratio of 1:1.5 to 1:2.5, which comprises drying hydroxides of aluminum selected from the group consisting of AlOOH and Al(OH)$_3$ at temperatures of up to 300° C. to remove water adhering thereto; grinding said hydroxides of aluminum with the aid of a non-aqueous grinding fluid to obtain a first suspension; grinding the carbon having grain sizes of $<2$ $\mu m$ with the aid of a non-aqueous grinding fluid to obtain a second suspension; mixing the first suspension and the second suspension with one another; separating the non-aqueous grinding fluid from the mixture of the suspensions to obtain a ground material; drying said ground material at temperatures of up to 300° C.; calcining said ground material at 400° to 1000° C. while passing nitrogen through; treating the calcined ground material under contact with nitrogen in a first step for 0.1 to 10 hours at 1100° to 1350° C. and in a second step for 1 to 100 hours at 1400° to 1700° C.; and removing the excess carbon contained in the reaction product by heating it to 500° to 900° C. in contact with oxygen-containing gases.

8. The process as claimed in claim 7, wherein the hydroxides of aluminum have grain sizes of $d_{50} > 2$ $\mu m$.

9. The process as claimed in claim 7, wherein carbon black is used as the carbon.

10. The process as claimed in claim 7, wherein hydrocarbons are used as the anhydrous grinding fluid.

11. The process as claimed in claim 7, wherein aliphatic alcohols are used as the anhydrous grinding fluid.

12. The process as claimed in claim 11, wherein 2-propanol is used as said grinding fluid.

* * * * *